July 14, 1925.  
S. E. ALLEY  
1,545,630  
VEHICLE WHEEL  
Filed Sept. 18, 1924  
2 Sheets-Sheet 1
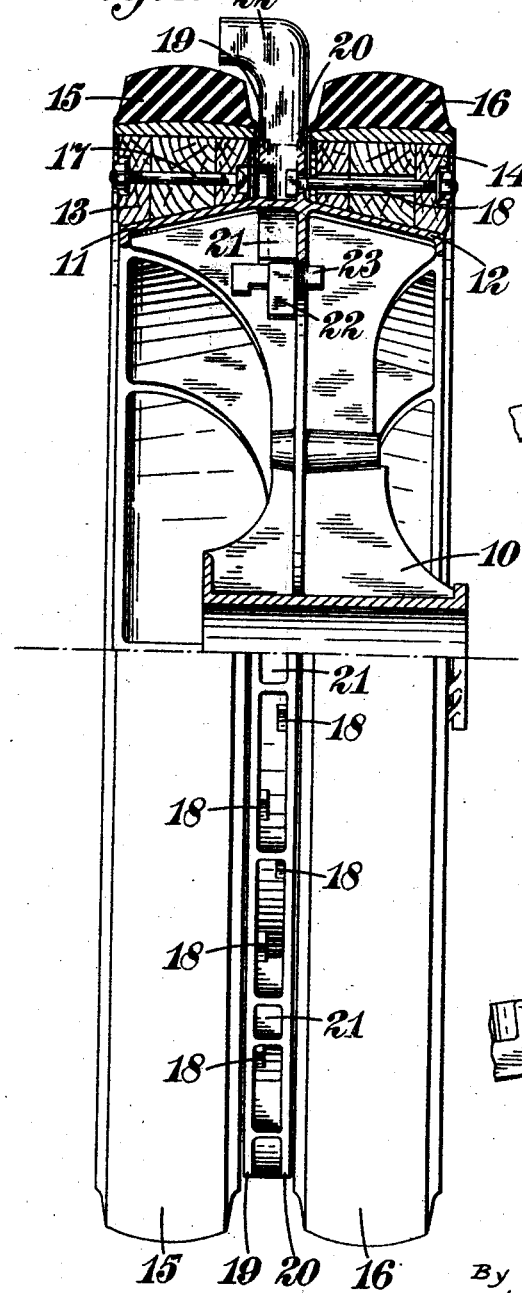
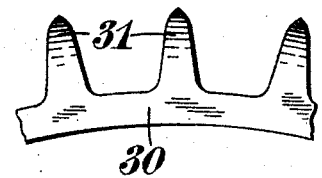
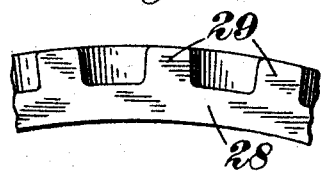
Inventor  
Stephen Evans Alley  
By  
Satom, Crit, Mrrae & Grindle  
Attys.

July 14, 1925.

S. E. ALLEY 1,545,630

VEHICLE WHEEL

Filed Sept. 18, 1924    2 Sheets-Sheet 2

Inventor
Stephen Evans Alley
By
Paton, Coit, Mora & Grindle

Patented July 14, 1925.

1,545,630

UNITED STATES PATENT OFFICE.

STEPHEN EVANS ALLEY, OF WESTMINSTER, LONDON, ENGLAND, ASSIGNOR TO THE "SENTINEL" WAGGON WORKS (1920) LIMITED, OF LONDON, ENGLAND, A BRITISH COMPANY.

VEHICLE WHEEL.

Application filed September 18, 1924. Serial No. 738,518.

*To all whom it may concern:*

Be it known that I, STEPHEN EVANS ALLEY, a subject of the King of England, residing at Westminster, London, England, have invented certain new and useful Improvements in Vehicle Wheels, of which the following is a specification.

This invention is for improvements in or relating to vehicle wheels and has for one of its objects to provide a construction of wheel which will be readily adaptable to varying conditions of surface over which it has to travel. It is another object of the invention to increase the driving contact of the wheel upon the ground over which it is travelling. It is a further object of the invention to arrange for the running surfaces of the tread portions of the wheel to be of different diameter and configuration. Thus any suitable combination of running surfaces may be utilized according to the season of the year or the particular type of ground over which the vehicle has to travel. For instance, one tread portion may have a running surface of smaller diameter than another tread portion on the same wheel, the surface of smaller diameter being intended to come into operation to increase the total running surface when the tread portion of larger diameter sinks into the ground over which the wheel is travelling.

For a more complete understanding of the invention reference is directed to the accompanying drawings which illustrate several constructions of wheel according to the invention. It is to be understood that the invention is not restricted to the precise constructional details illustrated.

In these drawings:—

Figure 1 is an edge elevation, partly in section, of one construction of vehicle wheel according to the invention.

Like reference numerals indicate like parts throughout the drawings.

Figure 2:
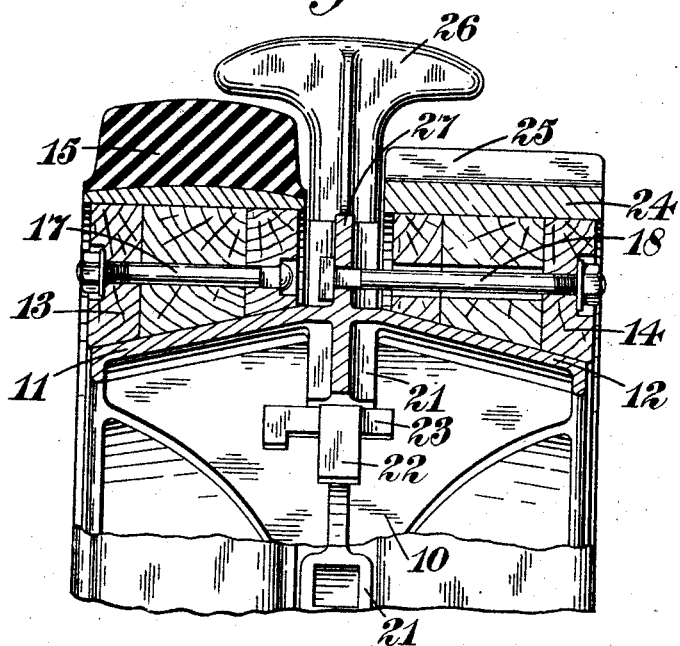
Figure 2 is a detail sectional view of a modified construction of wheel. This figure is on a scale larger than that of Figure 1.

Referring first to Figure 1, the wheel therein illustrated comprises a center portion 10 constituting the hub and spokes of the wheel. The outer circumferential surface of the portion 10 comprises two conical parts 11 and 12 which are concentric with the wheel axis and lie with their bases towards each other and towards the middle of the width of the wheel. The portions 11 and 12 are intended to receive the tread portions of the wheel and in the construction illustrated felloe rings 13 and 14 are wedged on to the parts 11 and 12 and these felloe rings carry the actual tread portions or tires 15 and 16 which in this view are shown as being of similar nature and formation. As illustrated, the cushion tires 15 and 16 are secured by vulcanization or in other convenient manner to metallic rims or bands mounted on the felloe rings 13 and 14. The integral parts of the felloe rings may be bolted together by bolts such as 17 while to draw the felloe rings into appropriaate wedging contact with the parts 11 and 12, bolts such as 18 may be employed. These bolts have their heads situated inwardly of radial circumferential flanges 19 and 20 on the center portion of the wheel, and the threaded ends of the bolts and the nuts thereon are countersunk in the outer side faces of the felloe rings so as not to foul anything during rotation of the wheel. It will be appreciated that by adopting the construction illustrated the tread portions may be separately adjusted on the center portion of the wheel. Alternatively, however, the tread portions may be drawn into place by bolts passing completely through both felloe rings.

The felloe rings and tread portions can be detached and changed with ease and renewal of or any tightening up or other adjustment of the tread portions relatively to the center portion of the wheel that may be necessary can be readily performed. In particular any suitable combination of tread or running surfaces may be adopted according to the road conditions to be encountered. Rubber tires are illustrated at 15 and 16, but steel tires with or without traction lugs or other serrations may be employed. For instance, one suitable combination consists in fitting a solid rubber tire, which may be mounted on a continuous or a segmental wooden or metal felloe ring, to that side of the wheel nearest the side of the vehicle, and a steel tire, also on a continuous or segmental wooden or metal felloe ring, or having inner conical surfaces formed on or attached to its inner portion and of lesser diameter than the rubber, on the other part of the wheel. On hard roads the rubber tire would take the load, affording satisfactory adhesion and allowing high speeds, but when the vehicle traverses soft ground the rubber tire would sink into the ground surface and the steel tire also come into play thereby spreading the load over a greater area. Another combination consists of a steel tire having traction elements on the side of the wheel nearest the vehicle side and a rubber tire on the other part of the vehicle. This combination provides for the ready detachment of the rubber tire when heavy ground is to be traversed and the substitution, therefor, of a tire, of rubber, metal or other material, with comparatively deep serrations or traction lugs. To permit of effecting this interchange, the inner steel tire is run on to a support such as a plank of wood so as to lift the outer part of the wheel clear of the ground.

As already indicated, the felloe rings 13 and 14 instead of being continuous rings may take the form of segments of similar cross-section.

The radial flanges 19 and 20 in addition to affording abutments for co-operation with the bolts 18, also serve to stiffen and strengthen the center portion of the wheel. They have, moreover, an additional function. At intervals around the wheel radial sockets 21 are formed which lie between the two tread portions. These sockets 21 are intended to form housings for detachable spuds 22 which may be locked in position by wedges such as 23. The shape of the spuds and the material of which they are made may be any desired. They may be paddle-shaped, that is to say may have wide flat heads and thinner stems formed or arranged to prevent their rotation. The heads of the spuds may project so as to overlap the tread portions if desired, but it will be understood that in any event the spuds will project beyond the diameter of the principal tread portions at approximately the middle of the width of the wheel so as to be able to engage a part of the ground surface which lies between other parts which are being compressed by the tread portions of the wheel. Consequently, the spuds will be enabled to secure more efficient road contact than would be the case if they were disposed at the outside of the wheel as is usual.

Referring now to Figure 2, the construction therein shown is in many respects similar to that shown in Figure 1. The felloe ring 13, however, is shown as carrying a rubber tire 15 while the felloe ring 14 is shown as carrying a steel tire 24 with traction lugs 25. The spuds 26, moreover, are of different formation, being of paddle-shape and overlying both tread portions. Instead of two radial flanges being provided between the tread portions for the reception of the bolts 18, there is only a single flange 27, but the sockets 21 for the spuds are of similar formation to those of Figure 1.

Figure 3:
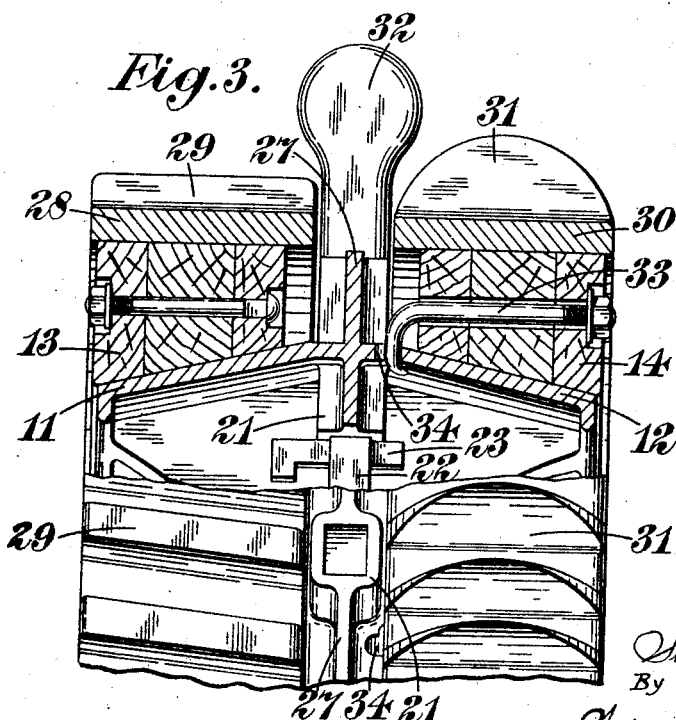
Figure 3 is a detail view, partly in section, of a further construction and also on a scale larger than that of Figure 1, and Figures 4 and 5 are side elevations of parts of metallic rims having traction lugs thereon as shown in Figure 3.

The construction shown in Figures 3, 4 and 5 is also in many respects similar to that shown in Figure 1, but the tread portion 13 is shown as being provided with a steel tire 28 with shallow traction lugs 29 and the felloe ring 14, with a steel tire 30 having deep lugs 31. A different formation of spud 32 is also illustrated. The felloe rings of this construction are secured in place by bolts 33 which hook into holes 34 in the conical parts 11 and 12 of the center portion of the wheel.

It is to be understod that the invention is not restricted to the precise constructional details hereinbefore set forth.

I claim—

1. A vehicle wheel comprising in combination a center portion, two detachable tread portions received concentrically on the outer circumferential surface of the said center portion but displaced the one relatively to the other along the wheel axis, means providing a wedging contact between the said tread portions and the center portion, and housings for detachable spuds so situated as to permit the spuds to be mounted in place to project radially from the wheel between the two tread portions without either of said tread portions being shifted.

2. A vehicle wheel comprising in combination a center portion, two tread portions which are separately detachable and are received concentrically on the outer circumferential surface of the said center portion but displaced the one relatively to the other along the wheel axis, and means providing a wedging contact between the said tread portions and the center portion, said center portion being formed on its outer circumferential surface with radial sockets lying between the tread portions to permit detachable spuds to be mounted in place to project radially from the wheel between the two tread portions without either of said tread portions being shifted.

3. A vehicle wheel comprising in combination a center portion formed on its outer circumferential surface with raidial sockets to receive detachable spuds and with circumferential ribs joining adjacent sockets, two detachable tread portions received concentrically on the outer circumferential surface of the said tread portion one at each side of the said radial sockets and circumferential ribs, and bolts passing through said ribs for securing said tread portions in position on said center portion.

4. A vehicle wheel comprising in combination a center portion whereof the outer circumferential surface comprises two conical faces concentric with the wheel axis and lying with their bases towards each other and towards the middle of the width of the wheel, and with radial sockets between the said conical faces, and with circumferential ribs joining adjacent sockets, two detachable tread portions received one on each of the said conical faces, means for securing said tread portions in position, spuds detachably mounted in said radial sockets and projecting radially from the wheel between the two tread portions and means coacting with said sockets and arranged to lock the spuds therein.

5. A vehicle wheel comprising in combination a center portion whereof the outer circumferential surface comprises two conical faces concentric with the wheel axis and lying with their bases towards each other and towards the middle of the width of the wheel, and with radial sockets between the said conical faces, two detachable tread portions received one on each of the said conical faces, means for separately adjusting each of the said tread portions on the center portion, and spuds detachably mounted in said radial sockets and projecting radially from the wheel between the two tread portions.

In testimony whereof I affix my signature.

STEPHEN EVANS ALLEY.